Oct. 21, 1930.   P. R. GLASS   1,779,091
MARKING MACHINE
Filed July 13, 1927    4 Sheets-Sheet 1

INVENTOR
Perley R. Glass
By his Attorney,
Nelson W. Howard

Oct. 21, 1930.　　　P. R. GLASS　　　1,779,091
MARKING MACHINE
Filed July 13, 1927　　　4 Sheets-Sheet 2

INVENTOR
Perley R. Glass

Oct. 21, 1930.   P. R. GLASS   1,779,091
MARKING MACHINE
Filed July 13, 1927   4 Sheets-Sheet 3

INVENTOR
Perley R. Glass

Patented Oct. 21, 1930

1,779,091

UNITED STATES PATENT OFFICE

PERLEY R. GLASS, OF WAYLAND, MASSACHUSETTS, ASSIGNOR TO UNITED SHOE MACHINERY CORPORATION, OF PATERSON, NEW JERSEY, A CORPORATION OF NEW JERSEY

MARKING MACHINE

Application filed July 13, 1927. Serial No. 205,504.

This invention relates to machines for marking, stamping or embossing pieces of work, such as parts of boots and shoes, and is herein illustrated as embodied in a machine for marking by means of pigment carried by a ribbon or strip.

Marking machines of the types which are frequently termed "embossing machines" apply a heated die to the back side of a pigment-carrying ribbon, such as a paper strip, and as the die forces the strip into contact with the work, the pigment is transferred to the work in the desired design and an object of the present invention is to provide an improved machine of this type comprising, as herein illustrated, novel strip handling mechanism and mechanism for adjusting the amount of pressure applied by the die.

In the use of a marking machine of the type referred to for stamping small pieces of work, such, for example, as the small, thin pieces known as "heel pods" and used as lining pieces above the heel seats of completed shoes, it has been found difficult to present the work pieces to the stamping die rapidly and in correct relation to the die without danger of injury to the operator's fingers by crushing or by burning. Moreover, the work pieces to be marked are commonly very flexible and not infrequently flimsy, and the desired marking often occupies a considerable portion of the area of the given piece of work. In view of these conditions, the marking machine illustrated as embodying the present invention comprises improved mechanism for transferring work pieces successively from a loading station to an operating station, at which they are marked, and thence to a discharge station. The novel features embodied in this mechanism are not claimed herein, however, as they form the subject-matter of a divisional application Serial No. 480,972, filed Sept. 10, 1930 in my name.

In machines utilizing a pigment-carrying strip, some sort of sizing is usually provided to insure that the pigment will adhere to the work when transferred to it by the heated die. While the use of such a pigment-carrying strip is entirely successful for the desired purpose, it involves the difficulty that the strip tends to stick to the work after a marking operation of the die and the strip and work may require to be separated before the work piece is removed and a new work piece is substituted. The problem is particularly acute when a work presenting device is employed, because, if the work carrier moves to take the piece of work away from the operating station before the strip has been separated from the work, it is likely that the strip will be torn, and, also, work of the character above referred to is likely to be wrinkled, which may result in disfiguring the freshly stamped design. In view of the foregoing, the illustrated marking machine also comprises improved stripper mechanism for separating the pigment-carrying strip from the work, the stripper being moved lengthwise of the pigment-carrying strip and across the path of movement of the die after each stamping operation and prior to movement of the carrier to transfer the work away from the operating station. Advantageously, too, and as illustrated, the operative movement of the stripper is in such a direction that the stripper tends to straighten out the piece of work instead of wrinkling it.

Since it is frequently necessary to remove a die and replace it with another having a different design, and since the dies vary in their dimensions, it is desirable to provide die-clamping means organized to facilitate the removal of a die and its replacement without requiring the exercise of great care on the part of the operator in centering the replacement die. To this end the illustrated marking machine is provided with a die-clamping device arranged automatically to center a die with respect to a work table. The novel features embodied in the die-clamping device are not claimed herein, however, as they form the subject-matter of a divisional application Serial No. 480,971, filed Sept. 10, 1930 in my name. In the illustrated construction, slidably mounted die-clamping members adapted to engage the opposite edges of a die are interconnected for equal and opposite movement upon actuation of a spring-pressed operating handle connected to one of the clamping members.

In marking machines of the type referred to, in which considerable pressure must be applied to the die at each marking operation, it is highly desirable to provide means for adjusting the amount of pressure applied in order that the correct pressure for a given die may be imparted to it. Such adjustment may be needed also by reason of differences in the character of the various kinds of work to be treated and because of variations in die temperature, such, for example, as variations between its temperature at the time the machine is started up and its temperature at the time the die becomes fully heated. Moreover, having once determined the amount of pressure desired for any particular die or any particular kind of work, it is convenient to be able to duplicate the setting readily. Accordingly, the illustrated marking machine also comprises a novel construction and arrangement by the use of which the pressure applied by the die may be varied readily and accurately and a previous setting may be readily duplicated. To this end, in the illustrated machine the pressure is applied by means of a toggle, and the degree of pressure may be varied by turning an eccentric spindle supporting one end of the toggle. For this purpose, the spindle is provided with a gear and an operating hand wheel having a worm connection to the gear is used for determining the position of the eccentric spindle. Thus, the construction and arrangement are such that a relatively large movement of the hand wheel produces only a relatively slight adjusting movement of the toggle, thereby facilitating obtaining accurate adjustment. Preferably too, an indicating device movable relatively to a fixed reference point is applied to one of the rotatable members referred to.

These and other features of the invention may best be understood by a consideration of the following description taken in connection with the accompanying drawings, in which.

The invention is herein illustrated as embodied in a marking machine of the type disclosed in United States Letters Patent No. 1,695,582 granted Dec. 18, 1928, upon the application of P. R. Glass and H. D. Elliott, Serial No. 21,344, filed April 7, 1925, to which reference may be had for descriptions of portions of the machine not fully set forth herein. As in that machine, the work is supported in the illustrated machine upon a tiltably mounted work table 10 (Fig. 6) which is resiliently supported in a frame 12 arranged to provide guides for a vertically movable goose-neck shaped slidable die carrying head 14, on the overhanging forward end of which a die-carrying block 16 is provided. The reciprocation of this die-carrying head is effected by means of a toggle 18 arranged to be straightened by a link 20 connected to a cam operated lever 22. This lever is actuated by a suitably shaped cam upon a drive shaft 24 journaled in the frame of the machine and connected by gears 25 (Fig. 6) to a motor shaft 27 provided with fast and loose pulleys 26 to which the belt is guided by means of a manually operable shift lever 28.

Figure 5:
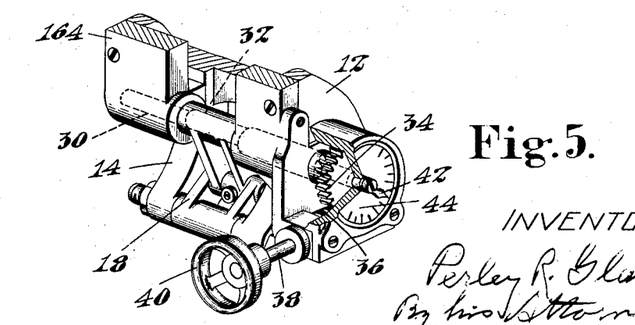
Fig. 5 is a perspective view of the pressure adjusting mechanism.

In order that the degree of pressure to be applied to the work may be exactly determined and adjusted, the spindle 30 forming a bearing in the frame for the upper link of the toggle 18 is provided with an eccentric portion 32 (Fig. 5) and means are provided for adjusting the position of this eccentric portion so that the pressure imparted by the toggle may be readily varied accurately. To this end, there is secured on the outer end of the spindle 30 a pinion 34 of substantial size engaging a relatively small worm 36 on a shaft 38 which is provided with an operating hand wheel 40 at its forward end in a position where it may be quickly and easily adjusted by the operator. A substantial movement of this hand wheel 40 will produce only a slight movement of the pinion 34 so that a very exact adjustment of the eccentric portion 32 on the spindle may be effected. To facilitate the reproduction of this adjustment when desired, the shaft is provided with an indicating hand 42 co-operating with a dial 44 forming part of the casing surrounding the pinion 34 and the worm 36. Thus the operator, having found exactly the setting most suitable for a particular kind of work and a particular die, may readily reproduce this setting when at a later time the same conditions are met.

The die-carrying block 16 is provided with an opening 46 (Fig. 6) to receive a heating cartridge and layers of heat-insulating material 48 are disposed between the block 16 and the head 14. The back side of the block 16 is recessed at 50 (Fig. 9) to receive overlapping meshing pinions 52 and 54 which are journaled therein. At the lower side of the block 16 recessed guideways 56 are provided which receive lateral ears 58 upon a forward clamping plate 60 and lateral ribs 62 upon a rear clamping plate 64 both of which plates are thereby slidably mounted in the block 16. It should be noted that the forward clamping plate 60 is provided with an overhanging flange 66, which co-acts with the beveled forward edge 68 of the rear plate 64 to form a dovetailed recess 70 (Fig. 6) in which the stamping die 72 is clamped. It will be seen from the inspection of the exploded view in Fig. 9 that the rear plate 64 is recessed to receive and partly support the forward plate 60 and that said forward plate is provided with teeth 74 for engagement with the pinion 54. The rear clamping plate 64 is also provided with a rack 76 for engagement with its pinion 52. This plate also is provided with a stop member 78 and with a pin 80 adapted to be received in the forked lower end 82 (Fig. 6) of an operating handle 84. A spring operated plunger 86 is suitably housed in a casing forming part of the slidable head 14 and is arranged to bear against the operating handle 84, thereby to force it to a position tending to close the die-clamping members 60 and 64. Because of the meshing of the pinions 52 and 54 and through co-action with the clamping plates 60 and 64, the movement of one of these plates by means of the operating handle 84 is effective simultaneously to separate both of the plates to allow the removal of the die 72. The construction and arrangement are such, also, that, whenever a die is placed in position to be clamped by the plates 60 and 64, irrespective of the exact width of the die, as determined by the particular design carried thereon, the die will be exactly centered in the die-carrying mechanism so that it will assume the desired position with respect to the work supporting table 10 without need for care on the part of the operator, since movement of the handle 84 to effect clamping movement of the plates 60 and 64 moves said plates equally.

Figure 4:
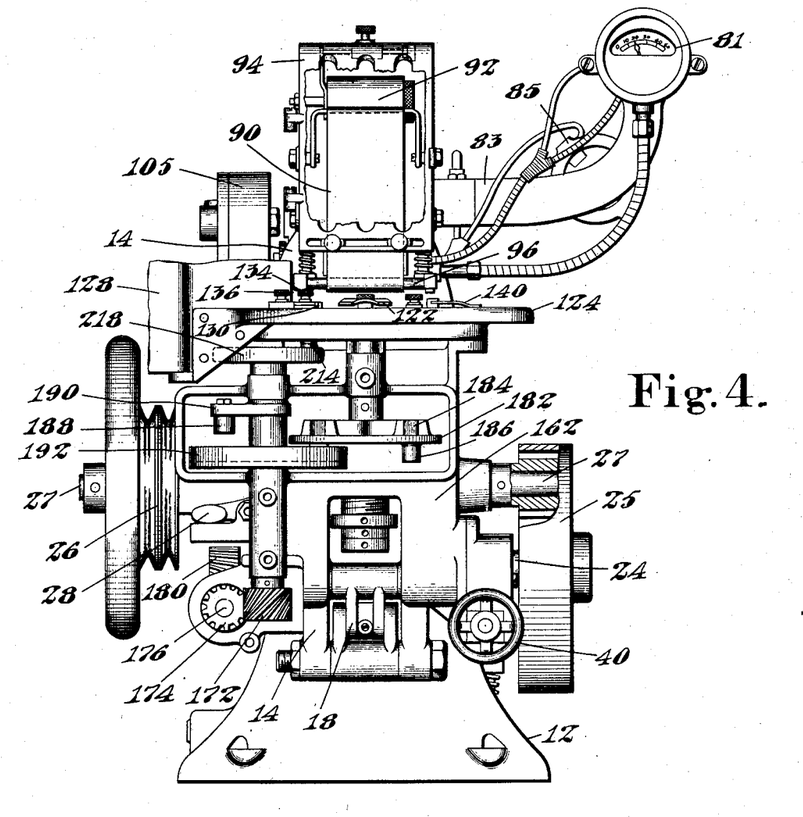
Fig. 4 is a front elevation of the machine.

In order that the temperature of the die-carrying member 16 and hence of the die 72 may be more exactly controlled, the supply of current to the heating cartridge 46 is determined by an adjustable thermostatically operated control member 81 (Fig. 4) which may be of any suitable commercial construction and is responsive to the heat of the die block to open and close the circuit in a well-understood fashion thereby maintaining the temperature of the die substantially constant. This control member 81 is mounted on an arm 83 which also carries a lamp socket 85 for a signal light (not shown) to show when the heating current is being supplied to the machine.

Figure 1:
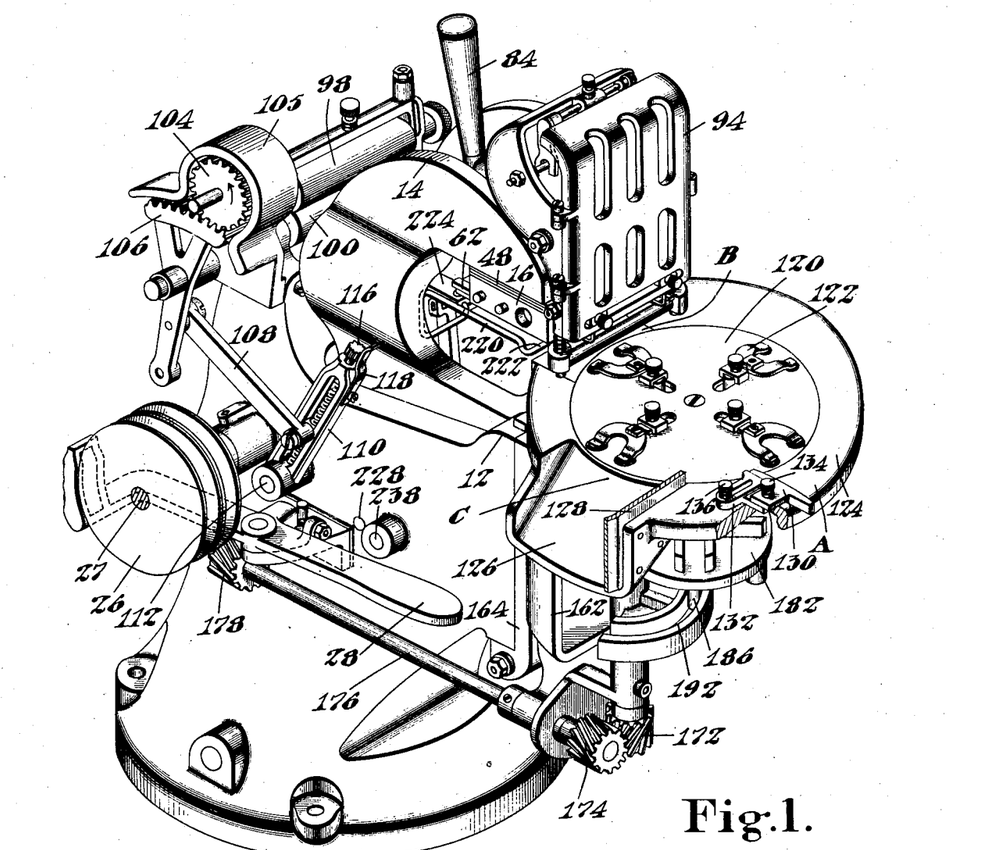
Fig. 1 is a perspective view of a marking machine embodying my invention with the usual hand wheel removed.
Figures 2, 3:
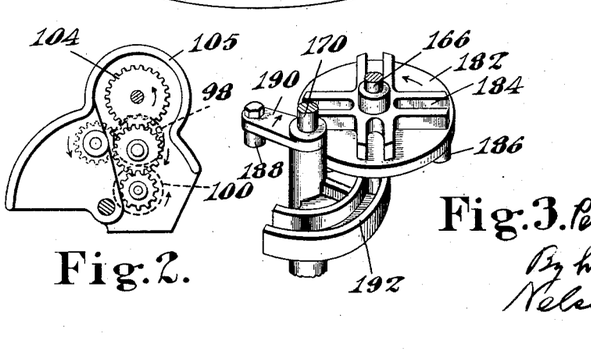
Fig. 2 is a detail of the carrier strip feeding mechanism.
Fig. 3 is a detail of the work carrier operating mechanism.

As in the machine disclosed in the application mentioned above, the pigment-carrying strip 90 is supplied from a roll 92 (Fig. 6) mounted in a casing 94 carried at the forward end of the die-carrying arm 14 and is guided downwardly and then rearwardly around a spring-pressed guide rod 96 between the laterally spaced members of the gooseneck-shaped die carrying head 14 to feed rolls 98 and 100, and thence travels down an inclined chute 102 to any suitable receptacle (not shown). The actuation of these feed rolls is effected by means of a pinion 104 (Fig. 1) forming part of a train of gears (shown in Fig. 2) within a casing 105, and by an oscillatable segment 106 connected by a link 108 to an arm 110 mounted on a cross-shaft 112 which is journaled in the frame of the machine and arranged to be oscillated by means of the co-action of a suitably shaped fork 114 (Fig. 6) with a cam on the drive shaft 24. As in the machine shown in the application referred to, the connection of the link 108 to the arm 110 is adjustable by means of a screw 116 (Fig. 1), the position of which is retained by a spring 118.

Figure 10:
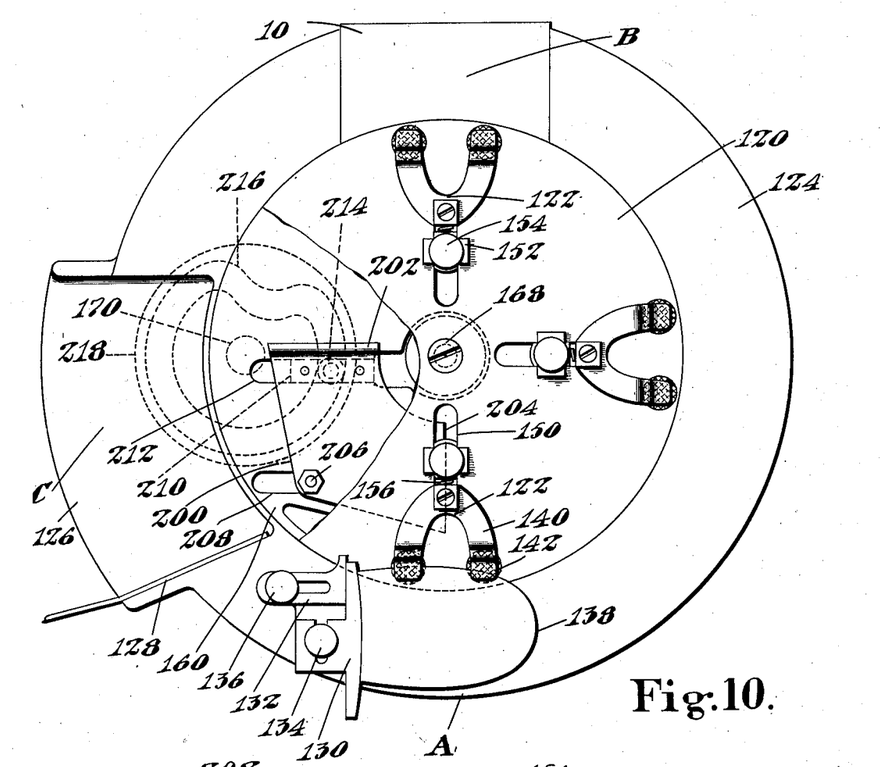
Fig. 10 is a plan view of the work carrier and the work table of the machine.

In order that small relatively thin and flimsy pieces of work may be more readily presented to the machine, there is provided a work presenting device which comprises a rotatable work carrier 120 having a plurality of work-clamping devices 122. This rotatable carrier is surrounded by a smooth annular table 124 extending from a loading station A at the front of the machine to an operating position B and thence to a discharge position C where the annular table is cut away to provide a discharge chute 126 on the near side of which there is attached a stop-plate 128, the rotatable carrier substantially filling the space within the annular table. The arrangement is such, as will be later described, that the clamps automatically release a piece of work as they approach the discharge station C and normally each piece of work will be thrown out by centrifugal force and slide down the chute 126 into a suitable receptacle (not shown). In case, however, any piece of work is caught in the clamping member, it will be brushed out of the clamp and into the chute by engagement with the stop-plate 128. At the loading station, there is provided a gage 130 adjustably held on a support 132 by a screw 134 and said support 132 is in turn adjustably held on the annular table by a screw 136, thus providing for the adjustment of the position of the gage 130 both from front to back and laterally. The particular gage 130 which is illustrated herein has its edge curved to fit the forward edge of a heel pod 138 (Fig. 10), but it will be understood that if other differently shaped pieces are to be treated by the machine, then another gage may be substituted which will be properly shaped to assist the operator in the positioning of such pieces.

Figure 12:
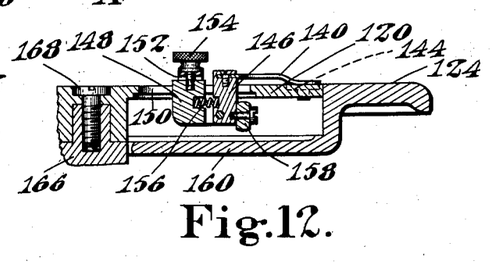
Fig. 12 is a radial section through the carrier, the annular table, and one of the clamping devices.

Each of the clamping devices 122 upon the work carrier 120 comprises a U-shaped clamping member 140 made of spring steel and having its free outer ends bent downwardly to overlie roughened spots 142 upon the work carrier 120. These roughened spots 142 are provided by means of studs 144 (Fig. 12) inserted in the surface of the table. Each U-shaped member 140 is centrally supported in a pivoted member 146 which is carried on an adjustable block 148 capable of sliding radially in the carrier 120 in a slot 150. Each adjustable block 148 is clamped in adjusted position by means of a cross-bar 152, the downturned ends of which are brought into gripping engagement with the upper surface of the work carrier 120 by means of a thumb-screw 154. A spring 156 is interposed between each of the blocks 148 and its pivoted member 146 normally to bias the free outer ends of the U-shaped member 140 into engagement with a piece of work interposed between said ends and the upper surface of the work carrier. Each pivoted member 146 is provided with an anti-friction roll 158 for a purpose to be later explained. It will be seen that the particular construction of the clamping devices 122 which has been described provides for a firm engagement with the margin of a piece of work, such as the heel pod 138, which is largely supported upon the annular table 124 and overlaps the carrier 120. This manner of engagement leaves the majority of the surface of the piece of work free for the action of the stamping die and at the same time provides a device by means of which the position of each piece of work with respect to the stamping die may be exactly determined. The radial adjustment of each clamping device allows its use with differently shaped pieces of work.

The annular table 124 including the chute 126 is made as a casting which is provided with a bottom member 160 forming a closure to cover and protect the parts of the clamping members which are below the work carrier 120. By means of this bottom member 160, the table 124 is attached to a casting 162 which in turn is attached to the machine by being secured to a cover plate 164 (Fig. 1) which co-operates with the frame 12 to guide the vertically reciprocable die-carrying head 14. The casting 162 is shaped (Fig. 6) to provide bearings for a vertical carrier shaft 166, to the upper end of which the work carrier 120 is attached by means of a screw 168. The casting 162 also provides bearings for a parallel cam shaft 170 (Fig. 10) on the lower end of which there is provided a skew gear 172 (Fig. 1) meshing with a similar gear 174 at the forward end of a counter shaft 176 the rear end of which is connected by suitable gears 178 and 180 (Fig. 4) to the drive shaft 24 of the machine. The connection between the cam shaft 170 and the carrier shaft 166 is such as to transform the continuous rotation of the cam shaft 170 into an intermittent rotation of the work carrier 120. To this end a form of Geneva movement (Figs. 3 and 4) is provided which includes a plate 182, the upper surface of which is provided with four radial grooves 184 corresponding in number to the number of clamping devices on the carrier. The lower surface of the plate 182 is provided with a corresponding number of locking rolls 186. On the cam shaft 170, on the other hand, there is provided an actuating roll 188 at the outer end of an arm 190 and this actuating roll 188 engages in each of the grooves 184 to give the plate 182 and hence the work carrier 120 one-quarter of a revolution every time the cam shaft 170 rotates. It will be noted that the work carrier 120 remains at rest during a considerable part of the rotation of the cam shaft 170 and the speed of this shaft is so controlled by a proper design of its driving gears that plenty of time is allowed for the placing of the work in the work clamp at the loading station A while the work carrier 120 is stationary and for the operation of the stamping die at the operating station B. In order that the work carrier 120 may be held positively against rotation during an interval of rest, a grooved cam quadrant 192 is provided upon the cam shaft 170 which is arranged to engage first one and then two of the locking rolls 186 during the time that the actuating roll 180 is out of engagement with one of the grooves 184. The extent of the quadrant 192 is such that it releases the plate 182 just as soon as the actuating roll 188 is ready to turn the plate 182. A positive drive is thus furnished which provides for rotation of the work carrier intermittently through 90 degrees to bring another piece of work to the operating station B and which is also arranged to hold the work carrier positively against rotation during the operation of the stamping die.

Figure 11:
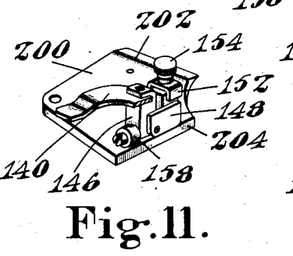
Fig. 11 is a detailed perspective showing the cam plate which controls the clamping device.

Since each of the U-shaped clamping members 140 is normally biased by the spring 156 into engagement with a piece of work on the carrier, it is necessary positively to open each clamping member as it comes to the discharge station so that a work piece will be discharged from the carrier and so that the work clamp will be open to allow the convenient insertion of another piece of work at the loading station A. Accordingly, there is provided on the upper surface of the bottom plate 160 of the annular table an irregularly shaped cam plate 200 (Figs. 10 and 11), the rear edge of which is beveled at 202 so that the roller 158 of the clamping device 122 which is approaching the discharge station C will ride up over the beveled edge 202 and thereby positively open the clamp. Since this releases the clamp while the work carrier is still in motion, the centrifugal force imparted to each piece of work will tend to and usually will throw it out into the chute 126. It will be noted that the forward square edge 204 of the cam plate 200 lies along a radius adjacent to the loading station A. It thus holds open that clamping device 122, which is at the loading station, to allow the interposition of a piece of work between the carrier 120 and the forward ends of the clamping member 140. In order that the clamp may be closed just before the work carrier 120 starts to move so that the operator can be sure that the work is clamped in correct position on the carrier, means are provided for shifting the cam plate 200 laterally to withdraw it from beneath the roller of the corresponding clamping member at the loading station before the carrier is started. To this end the cam plate 200 is guided by means of a stud 206 passing through a slot 208 in the bottom plate 160 of the annular table and is also provided with a block 210 slidably engaging another slot 212 in said bottom member. Upon the under side of this block 210 a roll 214 is provided which is arranged to engage a groove 216 of a cam member 218 secured to the upper end of the cam shaft 170. Accordingly, the actuation of the cam plate 200 is in timed relation to and precedes each movement of the work carrier 120 just as the movements of the carrier 120 are in timed relation to and precede each operation of the stamping die. The cam plate 200 is reciprocated once for every rotation of the cam shaft and hence once for every quarter rotation of the carrier.

Figures 6, 7, 8, 9:
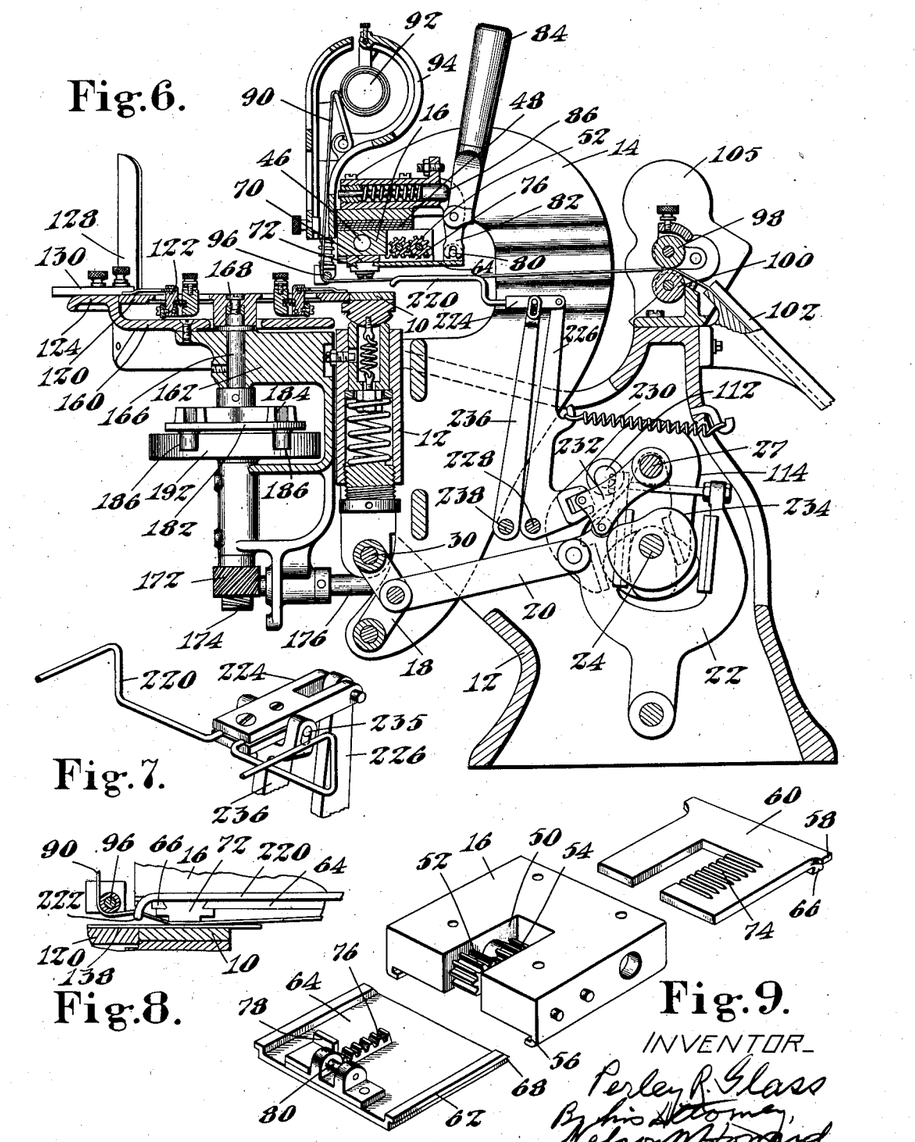
Fig. 6 is a vertical section through the machine from front to back intersecting the axis of the rotatable work carrier.
Fig. 7 is an enlarged perspective of a portion of the stripper showing its connection to operating links.
Fig. 8 is a detailed view showing the relation of the stripper to the stamping die when the latter is in contact with the pigment-carrying strip.
Fig. 9 is an exploded view of the die-clamping device.

As was explained above, the nature of the pigment-carrying strip 90 is such that there is a tendency for it to stick to a piece of work after it has been pressed thereagainst by the die 72. This tendency is somewhat offset by the relative positions of the guide rod 96 and the bite of the feed rolls 98 and 100, because after the die has receded and reached its elevated position the taut strip tends to pull away from the work. Furthermore, in a well-understood fashion, the spring mounting for the guide bar 96 helps to separate the strip 90 from the die 72 so that the adjacent portions of the strip which have not been used will not be unduly heated by close proximity to the die. It is found, however, that it is desirable positively to separate the pieces of work and the pigment-carrying strip 90 so that the feeding of the work may not be slowed down by reason of any adhesion between the two and so that there may be no danger of tearing the strip 90 as the pieces of work are removed from the machine. Accordingly, a looped stripper 220 (Figs. 6, 7 and 8) provided with a cross-bar 222 at its forward end is supported for movement across the path of movement of the die, the construction and arrangement being such that the stripper is moved forward to bring the cross-bar 222 in front of the die prior to its stamping action, and the stripper being disposed between the strip 90 and the piece of work 138 to be stamped (Fig. 8). After the die-carrying head has lifted, the stripper is moved rearwardly in a straight line along the length of the strip 90 in the direction of a radius drawn from the center of the work carrier 120 through the center of the operating table 10. This movement is effective to separate the strip 90 from the work 138 thereby avoiding the difficulties above mentioned.

The described movements of the stripper 220 are provided for by mounting said stripper in a holder 224 pivotally attached to the upper end of a lever 226 which is fulcrumed upon the frame 12 of the machine at 228. This lever is biased toward the rear of the machine by means of a spring 230 and is arranged to be moved forward by a modified bell crank 232 loosely journaled upon the shaft 112 and provided with a roller bearing against a cam 234 secured to the drive shaft 24. A parallel motion for the stripper 220 is secured by additionally supporting the holder 224 by means of a cross-pin 235 which engages the forked upper end of a pivoted arm 236 fulcrumed at 238. Small slots are provided at the upper ends of the forked holder to allow a slight deviation from the parallel movement and springs are provided (Fig. 6) in the arm normally holding the cross-pin 235 at the top of these slots. It will be understood that the stripper is advantageous when the pieces of work are handled by a presenting mechanism, such as that herein disclosed, because the movement of the work away from the operating position is so abrupt and quick that, if it were not for the stripper, such movement would be very apt to tear the paper strip in case of any adhesion between the two. Such movement would also tend to wrinkle up the work and perhaps disfigure the mark which had been applied if the strip 90 were allowed to adhere to the work, especially in dealing with thin flimsy work pieces. With the stripper arrangement just described, however, the strip is positively separated from the work and the separation is accomplished in such a direction that any resistance offered by adhesion between the work and the strip is effective to straighten out the piece of work, the pull being directly in line with and away from the clamp of the work carrier 120 which holds the given piece of work to the carrier.

In the use of the machine the operator, after pulling forward on the handle 84 to separate the plates 60 and 64, will insert the desired die 72. Upon releasing the handle to bring the plates 60, 64 into clamping engagement with the die, the operator is assured that the die will be exactly centered in its holder by the clamping mechanism. He will then adjust the paper feed if necessary by turning the screw 116 so that just the required amount of paper strip 90 is fed along at each operation, and, setting the machine in motion by means of the belt shifter 28, he will depress a suitable treadle (not shown) to cause rotation of the drive shaft 24. He will then supply pieces of work successively to the work carrier at the loading station A, controlling their position by means of the gage 130 and allowing them to be clamped in turn on the work carrier by the clamping devices 122 which will carry the pieces of work one by one along half way to the operating station B at the first depression of the treadle and to the operating station B at the next depression of the treadle. Each time the treadle is depressed, the work carrier 120 will move through 90 degrees and thus pieces of work will be carried successively to the operating station B and then to the discharge position C where they will be discharged into the chute 126. At each operation of the die, the stripper 220 will move forward prior to the descent of the die and then rearwardly after the die has been raised and before the work carrier 120 moves, positively to separate the strip 90 from the piece of work 138. The control of the temperature of the die may be effected through the control device 81 and the pressure applied may be controlled by the manipulation of the hand wheel 40. It will be understood that, if desired, the treadle may be maintained in depressed position so that the machine repeats its cycle in rapid succession, provided the operator supplies pieces of work at the loading station as fast as they are taken away by the work carrier 120.

Having described my invention, what I claim as new and desire to secure by Letters Patent of the United States is:

1. In a marking machine, a fixed part, a movable part, a toggle interposed between said parts to effect movement of the movable part toward or from the fixed part, a bearing spindle for one end of said toggle engaging one of said parts, said spindle having the portion to which the toggle is attached eccentric to the portion which engages the other part, and an operating handle having a gear connection to said spindle and extending to a position accessible for adjustment of the spindle to vary the pressure produced by the toggle.

2. In a marking machine, a relatively fixed work supporting table, a movable die-carrying member adapted to be pressed against the work supported on the table, a toggle interposed between said table and said die-carrying member to effect movement of the die-carrying member toward or from the table to press against the work thereon, means for controlling the pressure produced by the toggle comprising a bearing spindle for one end of said toggle engaging a fixed part of the machine, and means for providing an exact adjustment of the pressure produced by the toggle comprising a gear secured to the end of said spindle and a manually operable stub shaft having a worm meshing with the gear on the spindle and extending into an accessible position for adjustment by the operator.

3. In a marking machine, a fixed part, a movable part, a toggle interposed between said parts to effect movement of the fixed part toward or from the fixed part, a bearing spindle for one end of said toggle engaging one of said parts, said spindle having the portion to which the toggle is attached eccentric to the portion which engages the other part, a large gear on said spindle, a stub shaft provided with a hand-wheel, and a small gear on said stub shaft engaging said large gear whereby a substantial movement of the hand-wheel produces a relatively slight movement of the eccentric spindle thereby to vary and determine exactly the pressure to be applied by the toggle.

4. In a marking machine, a fixed part, a movable part, a toggle, interposed between said parts to effect movement of the fixed part toward or from the fixed part, a bearing spindle for one end of said toggle engaging one of said parts, said spindle having the portion to which the toggle is attached eccentric to the portion which engages the other part, an indicating device on said spindle movable relatively to a fixed reference mark, a gear on said spindle, a stub shaft at right angles to said spindle provided with a worm meshing with said gear, and an operating hand-wheel at the outer end of said stub shaft whereby the operator may conveniently effect adjustment of the position of the eccentric spindle by means of the rotation of the hand-wheel and, by reference to the indicating device, duplicate a previous setting.

5. In a machine for marking pieces of work by the application of a presser member exerted against a pigment-carrying strip interposed between said presser member and the piece of work, means for guiding said strip across the face of the presser member and a stripper movable in the direction of the length of the strip constructed and arranged to be dragged between the strip and the work to separate the two after a marking operation.

6. In a machine for marking pieces of work by relative movement of a die and a work support to impress the die in a pigment-carrying strip and to press said strip against a piece of work on the work support, a stripper constructed and arranged to separate said pigment-carrying strip from the work, and means for moving the stripper across the path of said relative movement of the die and the work support to effect the separation of the strip from the work.

7. In a machine for marking pieces of work by relative movement of a presser member and a work support to carry the presser member against a pigment-carrying strip thereby to press said strip against a piece of work on the work support and then relatively to separate the presser member and the work support, a stripper constructed and arranged to separate said pigment-carrying strip from the work, and means constructed and arranged to move the stripper from one side of the presser member across the path of relative movement of the presser member and support to effect a separation of the pigment-carrying strip from the work after said relative movement of separation of the presser member and the work support.

8. In a machine for marking pieces of work by relative movement of a die and a work support to impress the die in a pigment-carrying strip and to press said strip against a piece of work on the work support, a stripper constructed and arranged to separate said pigment-carrying strip from the work, and means constructed and arranged to move the stripper from one side of the die across the path of relative movement of the die and support to effect the separation of the pigment-carrying strip from the work and to return the stripper to said side of said path of relative movement before the next relative movement of the die and support.

9. In a machine for marking pieces of work by relative movement of a presser member and a work support to bring said presser member against a pigment-carrying strip thereby to press said strip against the piece of work on the work support, a stripper movable between the pigment-carrying strip and the piece of work, and means for operating said stripper to effect a separation of the strip from the work.

10. In a machine for marking pieces of work by relative movement of a die and a work support to impress the die in a pigment-carrying strip and to press said strip against a piece of work on the work support, a stripper constructed and arranged to separate said pigment-carrying strip from the work, and means constructed and arranged to move the stripper from one side of the die across the path of relative movement of the die and support prior to the engagement of the die with the strip and to move said stripper reversely after engagement of the die with the strip to separate the strip from the work.

11. In a machine for marking pieces of work by die pressure exerted against a pigment-carrying strip interposed between a die and a piece of work, a carrier movable intermittently to present successive pieces of work at an operating station for marking and to carry the pieces of work away from said station, and means operating in timed relation to said carrier to separate the pigment-carrying strip from each piece of work prior to movement of the carrier to take said piece of work away from the operating station.

12. In a machine for marking pieces of work by impressing a die in one side of a pigment-carrying strip to press said strip against a piece of work, a movable carrier provided with a clamping device for engagement with the edge of a piece of work and arranged to transfer successive pieces of work to and away from a die-operating station, a stripper movable between the pigment-carrying strip and the piece of work, and means operating the stripper to separate the two after a die impression has been effected and prior to movement of the carrier to transfer the work away from said operating station, said means being effective to move said stripper away from the clamping device in a direction to straighten the piece of work.

13. In a machine for marking pieces of work by impressing a die in one side of a pigment-carrying strip to press said strip against a piece of work, a rotatable carrier for presenting successive pieces of work at a die-operating station, said carrier being provided with a clamping device adapted to hold a piece of work against radial movement thereon, and a stripper movable radially of the carrier in a direction from the center of the carrier toward the operating station and constructed and arranged to separate the pigment-carrying strip from the piece of work held on said carrier.

In testimony whereof I have signed my name to this specification.

PERLEY R. GLASS.

CERTIFICATE OF CORRECTION.

Patent No. 1,779,091.   Granted October 21, 1930, to

PERLEY R GLASS.

It is hereby certified that error appears in the printed specification of the above numbered patent requiring correction as follows: Page 6, lines 87 and 103, claims 3 and 4, respectively, for "fixed" read movable; and that the said Letters Patent should be read with these corrections therein that the same may conform to the record of the case in the Patent Office.

Signed and sealed this 16th day of December, A. D. 1930.

(Seal)

M. J. Moore,
Acting Commissioner of Patents.